Aug. 18, 1942.   E. W. KELLOGG ET AL   2,293,149
CONTROLLED FILM SOUND REPRODUCER
Filed July 20, 1940   3 Sheets-Sheet 1

Inventors
Edward W. Kellogg
& Hillel I. Reiskind
By
Attorney

Aug. 18, 1942.  E. W. KELLOGG ET AL  2,293,149
CONTROLLED FILM SOUND REPRODUCER
Filed July 20, 1940   3 Sheets-Sheet 3

Inventors
Edward W. Kellogg
& Hillel I. Reiskind
By
Attorney

Patented Aug. 18, 1942

2,293,149

UNITED STATES PATENT OFFICE 2,293,149

CONTROLLED FILM SOUND REPRODUCER

Edward W. Kellogg, Moorestown, and Hillel I. Reiskind, Camden, N. J., assignors to Radio Corporation of America, a corporation of Delaware Application July 20, 1940, Serial No. 346,544

13 Claims. (Cl. 179—100.3)

This invention relates to control tracks for the purpose of controlling volume, tone quality, loudspeaker placement, or the like, in connection with sound records on film.

The use of a control track of predetermined frequency and variable amplitude for the producing of such results is disclosed in Weinberger Patent 1,850,701. The control track disclosed by Weinberger is of such a nature that the track uses a portion of the film which may be otherwise useful, as, for example, for the provision of additional sound tracks, or the like. The Weinberger invention was improved by C. M. Burrill, as described and claimed in his application Serial No. 181,644, filed December 24, 1937 (RCV D-5098), by placing the control track in the sprocket-hole area of the film and using the sprocket-hole frequency as a carrier frequency. This arrangement saves film area, for the reason that the sprocket-hole area is not useful for sound tracks. An analogous arrangement is also described in Dawson Patent 2,199,559 of May 7, 1940.

We have found that, although it is desirable to use the sprocket-hole area as described by Burrill, it is not always desirable to use the sprocket-hole frequency as a carrier frequency. Among the reasons for the undesirability of using the sprocket-hole frequency are the additional frequencies produced by the opacity of the edges of the sprocket hole and the low amplitude of the modulation range which can be secured.

When the sprocket-hole frequency is used as a carrier frequency, the minimum modulation obtainable is that produced when the lands (the spaces between the sprocket holes) are clear; while the maximum modulation is produced when the lands are completely blackened. This provides a total volume range of the order of 15 db. Since the modulation amplitude is a function of the film base transmission, any variation in the characteristic of the film base will affect the modulation range. For example, the use of a tinted film base or of an emulsion having a general coloration or density will greatly decrease the available range. Likewise, any oil or dirt generally distributed over the surface of the film materially decreases the volume range.

The present invention pertains to a track recorded in the sprocket-hole area which avoids these limitations. This track uses a frequency considerably higher than the sprocket-hole frequency and which may be a multiple of the sprocket-hole frequency. The effect of the sprocket holes may be eliminated by using a plurality of slits for scanning, so that the desired frequency is continuously being impressed on at least one of the slits and the effect on the sprocket-hole edges may be eliminated by tilting the slits at an appropriate angle to the axis of the sound track.

One object of the invention is to provide an improved type of control track.

Another object of the invention is to provide an improved type of control track in the sprocket hole area.

Another object of the invention is to provide a control track in the sprocket-hole area which will greatly attenuate the sprocket-hole frequencies.

Another object of the invention is to provide a control track in the sprocket-hole area which will operate at any desired frequency.

Another object of the invention is to provide a control track in the sprocket-hole area which will not respond to the edges of the sprocket holes.

Another object of the invention is to provide a control track in the sprocket-hole area in which the effect may be kept constant independent of variations in the transparency of the film.

Another object of the invention is to provide an improved reproducer for such a control track.

Another object of the invention is to provide an improved apparatus for recording a control track of any desired frequency in the sprocket-hole area.

Another object of the invention is to provide a reproducer for reproducing signals from a control track in the sprocket-hole area without reproducing the sprocket-hole frequency.

Other and incidental objects of the invention will be apparent to those skilled in the art from a reading of the following specification and an inspection of the accompanying drawings, in which Figure 1 is a diagrammatic illustration of one form of our improved control track, Figure 2 is a schematic illustration of a recording optical system for recording the control track of Fig. 1, Figure 3 is an illustration of the type of wave produced from the control track of Fig. 1, Figure 4 is a schematic wiring diagram of one type of reproducer for the control track, Figure 5 is a schematic wiring diagram of a second type of reproducer for the control track, Figure 6 is a schematic wiring diagram of a third type of reproducer for the control track, Figure 7 is a diagrammatic illustration of a second type of control track, Figure 8 is an illustration of a special drum which may be used in printing or reproducing the type of control track shown in Fig. 7, Figure 9 is a schematic illustration of one type of apparatus for producing the control track shown in Fig. 7, and Figure 10 is a schematic illustration of a recording apparatus for producing a control track which is a modification of that shown in Fig. 1.

The first form of our improved sound track is illustrated in Fig. 1. This figure diagrammatically illustrates the relation of the control track, sprocket holes and slit, but omits the physical representation of the film itself. The sprocket holes are generally indicated at 10 and, as shown, the space between the sprocket holes on a standard motion picture film is considerably longer than the dimension of the sprocket holes in the direction of movement of the film. Between the sprocket holes are recorded the control track waves 11. For convenience in illustration, these waves are indicated as more or less of a saw-tooth shape, but, as a matter of practice, it would be much simpler to record sine waves or waves having approximately a sine shape, as such waves are relatively simple to generate and transmit. It will be noted that these waves are tilted so that they have an angle other than 90° to the axis of the sprocket holes. The scanning slit 12 is tilted at the same angle as the axis of the individual waves.

The reason for this arrangement is that it is desirable to use a control frequency considerably higher than the sprocket-hole frequency. If such a frequency were recorded in the space between sprocket holes in waves at 90° to the axis of the sprocket holes, the scanning slit, for satisfactory reproduction, should be similarly located and should have a width small in comparison to the wave length of the recorded signal. Such a slit would produce very pronounced impulses from the edges of the sprocket holes, which are effectively opaque. If the slit is tilted at an angle, as shown at 12, the sprocket-hole edges produce no more impulse in the reproducing system than if an aperture were used having the same length measured along the sprocket-hole axis as the entire distance occupied along that axis by the diagonal slit.

Several methods may be employed to record the skewed wave. One way is to rotate the entire recording optical system about the optical axis of the objective, which, of course, would produce a corresponding rotation of the image on the film. Due to the mechanical construction of certain optical systems and recorders, this method is not particularly convenient. Under certain conditions, the arrangement shown in Fig. 2 is more satisfactory.

In this recording arrangement, the usual exciter lamp 20 emits light which is directed by the condenser lens 21 through the aperture in the plate 22. The lens 23 focuses this light on the galvanometer mirror 24, whence the light is reflected through the lens 25 to the slit plate 26. All these parts are arranged as usual for recording with the sound wave axis at 90° to the direction of film movement. Light passing through the slit plate 26 is focused by the objective 28 on the film F in the usual manner. Between the slit plate 26 and the objective 28, there is interposed a Dove prism 27. This prism, as is well known, has the property of rotating the beam of light transmitted through it at twice its own angle of rotation. For example, if the axis of the waves is to be inclined at an angle of 20° to the perpendicular to the film axis, the prism 27 would be located with its base at an angle of 10° to the plane defined by the slit in the plate 26 and the optical axis through the objective 28. Another way of producing the skewed track is to rotate both the slit and the aperture plate the proper amount, leaving the remainder of the optical system unchanged, and to reshape the apertures to correspond.

Figure 1:
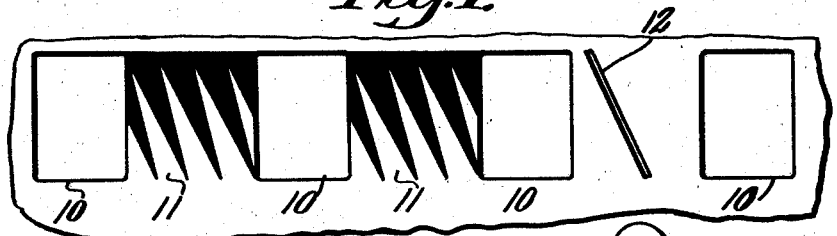

In this amplifier, light directed through the control track strikes the photocell 30, the output from which is passed through the transformer 31 to the type 6K7 tube 32. The output from the tube 32 is passed through the transformer 33 to the dividing network 34 for which two band pass filters may be substituted. The higher frequency, that is, the control frequency, is taken from the upper leads and passed through a rectifier and filter arrangement similar to the ground noise reduction rectifier circuit and applied to such control purposes in the main amplifier as may be desired, as, for example, control of amplification. The 96 cycle waves produced by the sprocket holes, which, after passing through the transformers, amplifier 32 and dividing network, are substantially sine waves, are passed through the 96 cycle amplifier 35 and transformer 36 to the rectifier 37. This rectifier 37 produces a potential across the resistor 38 which varies the grid bias on the tube 32, thereby varying the amplification thereof. This feedback of the 96 cycle tone tends to maintain the same at substantially constant output level by compensating in the amplifier tube 32 for such changes as may result from variations in lamp brightness, photocell sensitivity or "B" voltage. But it will be noted that it likewise compensates for the effects of these factors on the output of the higher frequency control tone, making the latter dependent only on the amount of modulation which the recorded track applies to the light beam or light beams by which it is being scanned.

The control track illustrated and described above is of such a nature that the average transmission thereof is always 50 percent relative to clear film regardless of the recorded frequency or of the amplitude thereof. The amplitude of the 96 cycle tone is, therefore, entirely independent of the control frequency and varies only with variations in the photocell output caused by changes in exciter lamp current variations in the voltage applied to the photocell, or variations in photocell sensitivity, and these will similarly affect both the 96 cycle output and the control tone output.

The use of the 96 cycle feedback is not limited to its application after a single stage of amplification, but it may be applied after as many stages of amplification as desired so that any changes in the gain of these amplifier stages will be similarly compensated for.

Figure 4:
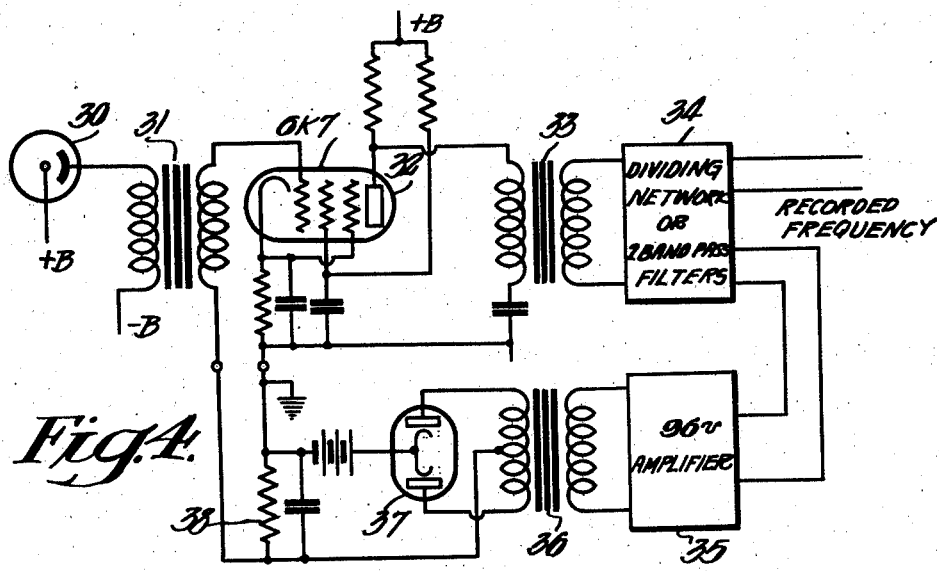
Fig. 4 shows one type of amplifier which may be used in reproducing our control track, and this amplifier is based on and is quite similar to the amplifier described and claimed in application Serial No. 326,912, filed March 30, 1940 (RCV Docket 7478), but differs therefrom in that it is specifically adapted to the reproduction of the sprocket hole control track.
Figure 5:
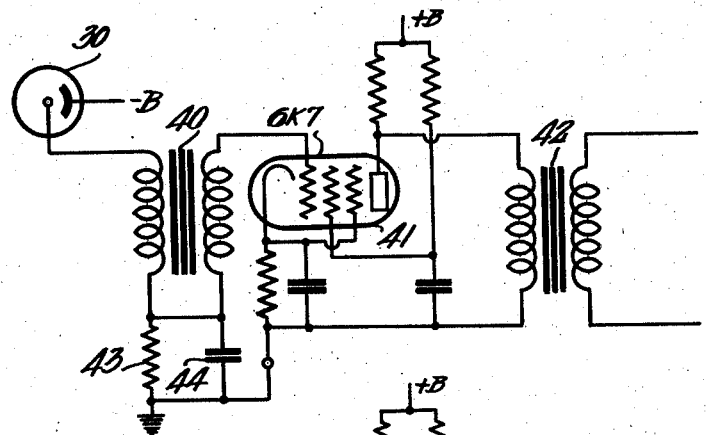

The average photocell current may be similarly used to compensate for exciter lamp or photocell potential variations, and a circuit for accomplishing this result is shown in Fig. 5. In this circuit, any increase in average photocell current produces an increase in the drop across the resistor 43, thereby causing an increase in the grid bias of the 6K7 tube 41. The resistor 43 is, of course, shunted by the usual condenser 44. As in the circuit shown in Fig. 4, the output from the photocell 30 is fed through transformer 40 to the 6K7 tube, and the output from the tube 41 is fed through the transformer 42 to such other amplifiers as it may be desired to control. This circuit, although producing considerable compensation, will not compensate exactly for the variations for the reason that the output of the photocell and the voltage across the resistor varies linearly with the illumination photocell sensitivity, polarizing voltage, etc., while the gain of the 6K7 varies approximately logarithmically with the control bias. The circuit, however, can be made quite satisfactory for the ordinary ranges of variation by properly proportioning the circuit constants, and the difference between the linear and logarithmic variation will be considerably less than the variation in output without such compensation.

If the 6K7 is replaced by a tube so designed that a linear relation is maintained between grid bias and gain, this circuit will compensate completely.

Figure 6:
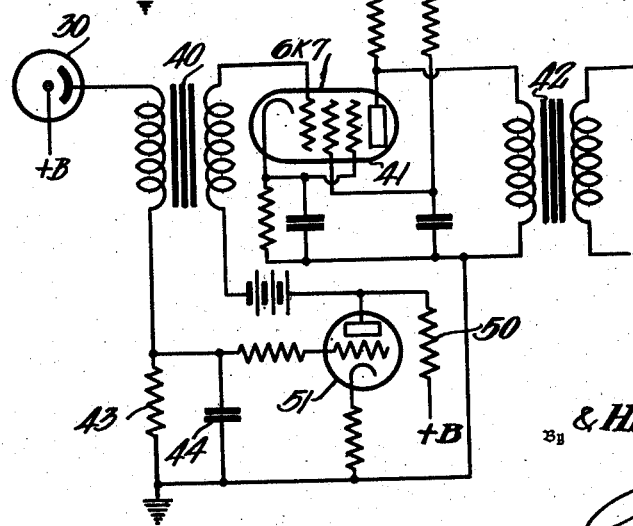

The deficiencies of the circuit shown in Fig. 5 can be corrected by the modification thereof shown in Fig. 6. In this circuit, as in Fig. 5, the output of the photocell 30 passes through the transformer 40 to the 6K7 tube 41, the output of which goes through the transformer 42 to such apparatus as it is desired to control. The photocell resistor 43 produces a voltage drop in accordance with the variations in average photocell current, as in Fig. 5, but this voltage is applied to the grid of a logarithmic tube 51 which, in turn, provides a voltage drop across the tube 51, and since the voltage will vary logarithmically with linear variations in the average photocell current, proper correction will be secured.

The apparatus above described is not limited to the use of a single control frequency, but a plurality of frequencies can be provided and separated by appropriate filters and used for several different control purposes, if desired, as described, for example, in Weinberger Patent No. 1,850,701.

One disadvantage of the apparatus above described is that the control frequency is intermittent rather than constant. This disadvantage can be avoided by the arrangement shown in Fig. 7. In this arrangement, a control tone is used which is a multiple of twice the sprocket-hole frequency (192 cycles on the basis of the present standards of 64 sprocket holes per foot and a film speed of 90 feet per minute). If other standards are used, the control tone must be changed accordingly.

Figure 7:
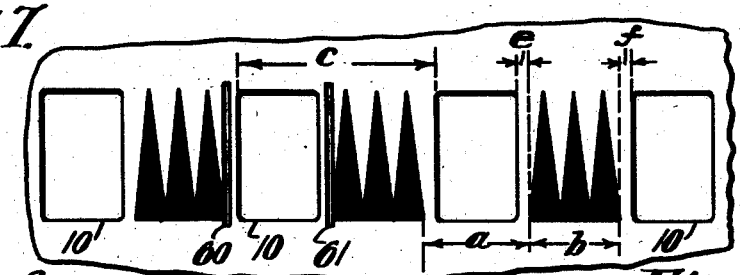

Two slits are used as indicated at 60 and 61 in Fig. 7, and these are spaced apart by half of the sprocket-hole pitch or .0935 inch for present standards. The reproducing slots or light beams are provided in any customary fashion. For example, two slits in a single aperture plate may be illuminated by a common light source, and the image thereof focused on the film by the usual type of sound reproducing system, or two illuminated slits adjacent to the film may be used. The light passing through the two slits is directed to a single photocell which may be connected to an amplifier such as described above in connection with Figs. 4, 5 or 6.

In Fig. 7, the distance $b$, which is the length of one group of control frequency waves, is equal to the distance $a$, which is the space between the groups including the sprocket hole and the sum of these is equal to the distance $c$, which is the pitch of the sprocket holes. As will be seen from Fig. 7, when the scanning beam 60 is leaving the last of one group of control frequency images, the slit 61 is just entering the next group and, as a consequence, a continuous tone will be produced. Although in Fig. 7 the control frequency waves and the slits are shown as perpendicular to the axis of the sprocket holes, for the sake of convenience in illustration, they may and should be tilted at an angle as shown in Fig. 1 in order to avoid any material effect from the edges of the sprocket holes. It should be noted that the spacing of the slits or scanning beams 60 and 61 must be a whole number of wave lengths of the control frequency so that the output from the photocell produced by the two light beams will be in phase.

Figure 8:
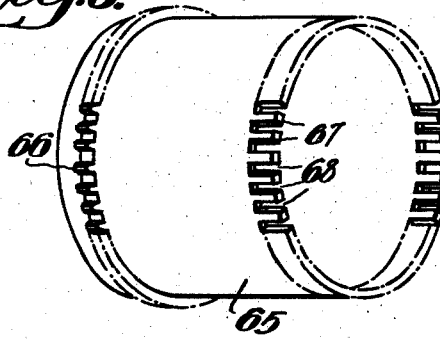

In order to produce a positive sound track such as that shown in Fig. 7, the simplest way is to record the control tone continuously in the sprocket-hole area. After the tone is recorded, but before the film is processed, the film is given a second exposure with an apparatus such as that shown in Fig. 8. The drum 65 of Fig. 8 is provided with sprocket teeth 66 to enter one row of sprocket holes on the film. In alignment with the other row of sprocket holes, it is provided with alternate teeth 67 and slots 68 corresponding in width with the distances $a$ and $b$ of Fig. 7. The film is run over this sprocket, and light is directed through the slits 68 onto the film so as to completely expose the areas $e$ and $f$ in Fig. 7. Since these areas are completely exposed in the negative, the corresponding areas on the positive print will be left clear, as shown in Fig. 7, and only the even number of control frequency waves will be reproduced.

It is necessary that this second exposure be properly located with respect to the sprocket holes, and the drum of Fig. 8 accomplishes this result by having the center line of the slot 68 lined up with the center line of the sprocket teeth 66. The drum of Fig. 8 may, of course, be included directly in the recording machine and have an appropriate lamp within the drum for directing light through the slits onto the film, and a second exposure operation is thereby avoided.

Figure 9:
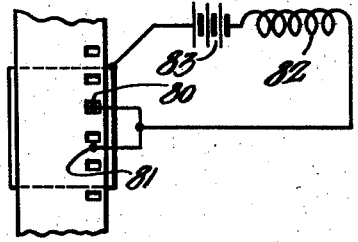

An alternative alignment for producing the additional exposure at the points $e$ and $f$ of the negative film is shown in Fig. 9. In this arrangement, a pair of contactors 80 and 81 connected in multiple are arranged at a distance apart equal to one-half of the sprocket hole pitch minus the width of a sprocket hole. Under these conditions, the film moves a distance equal to a half sprocket hole pitch without either contact being closed, and during the next equal period one or the other contact is closed. When a sprocket hole passes under either contactor, the circuit is completed through a source of current 83 and the winding 82 which may be the bias winding of a galvanometer constructed as described in Kellogg Patent No. 2,139,235 and this moves the galvanometer to such a position as to completely expose the desired area of the film. Instead of connecting the contactors to the bias winding of the galvanometer, they may be connected to a D.-C. amplifier actuating the recording galvanometer. According to the direction of connection of the galvanometer, the circuit may either bias such an amplifier to cut-off and thereby cause the galvanometer to swing completely across the film or the bias may be reduced or removed on the amplifier accomplishing the same result. Instead of making contacts through the film perforations, the film may be carried on a toothed drum or sprocket on the shaft of which is a commutator having alternate conducting and nonconducting segments so that the circuit of 82—83 will be closed during the desired intervals.

Another method of producing the desired positive film, wherein the recorded tone is limited to segments exactly one-half sprocket hole pitch long, is to use a notched sprocket wheel similar to Fig. 8 for making the prints, instead of blackening the negative for a certain portion of the distance. In this case, the notches would be half way between the teeth, and the negative and print film would both be wrapped around the toothed drum, with the negative next the drum, and with a source of illumination provided within the drum.

The film of Fig. 7, either as shown or as modified by tilting the frequency waves when reproduced through the double slit optical system, will deliver a continuous tone of the control frequency with the 96 cycle tone of the sprocket holes superposed thereon. The amplitude of the 96 cycle tone will be independent of the amplitude of the control frequency and may be used to maintain a constant degree of amplification of the control tone, as described above in connection with Figs. 4, 5 and 6.

If desired, it is possible to eliminate the 96 cycle component from the reproduction by the double slit arrangement by using a slotted drum such as shown in Fig. 8 in the reproducer. This drum would be modified in that the center line of the lands 67 instead of the center line of the slots 68 would be lined up with the sprocket teeth 66. The reproducing beams 60 and 61 would then be directed through the film and the slots 68 onto the photocell, for example, by an arrangement such as that described in Loomis et al. Patent No. 2,019,147. It will be apparent that in this arrangement, the light from only one scanning line will reach the photocell at one time, as the light from the other line will be interrupted by the lands 67, and a continuous tone of the control frequency only will accordingly be produced.

Figure 2:
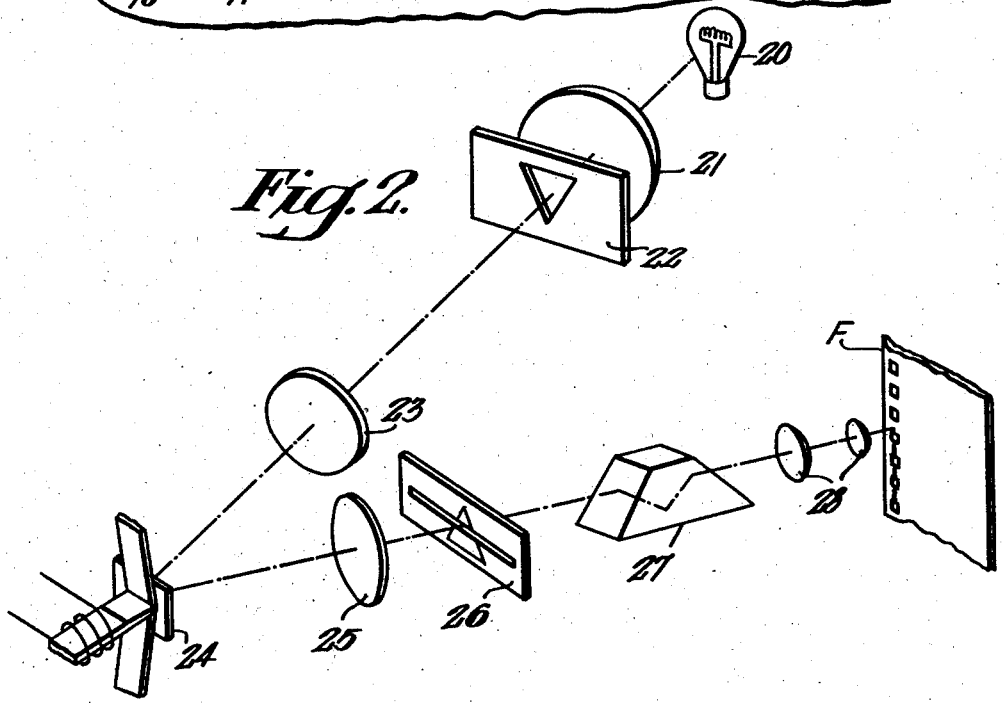
Figure 3:
Fig. 3 illustrates the type of output which will be obtained from the track shown in Fig. 1 when reproduced by means of the slit 12 and through a photocell.
Figure 10:
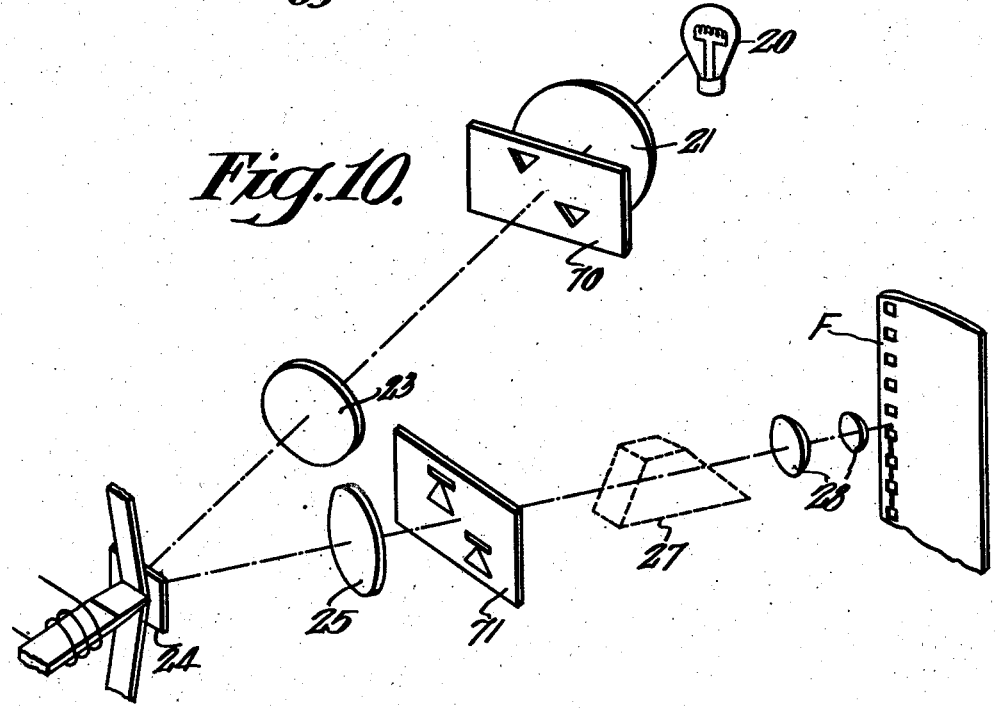

The double slit arrangement just described, although providing a continuous control tone either with or without a 96 cycle component, requires the use of frequencies which are multiples of 192 cycles. The frequencies used, therefore, will necessarily be in a harmonic relation to each other and for that reason may be somewhat difficult to completely separate. An alternative construction of the recording apparatus and manner of recording which is quite similar to that just described permits the use of any desired frequency. This alternative arrangement uses two similar control tone tracks side by side in the sprocket-hole area and these two tracks are so recorded that one track is out of phase with the other by one-half of the sprocket-hole pitch. The tracks will, therefore, appear identical with that shown in Fig. 1 or Fig. 7 but each track will have a width equal to half the length of the sprocket holes and a similar track will be immediately beside it but out of phase. Such a track may be recorded by the optical system illustrated in Fig. 10. Insofar as the parts are the same as those shown in Fig. 2, they are indicated by similar reference numerals and their operation is not again described. The aperture plate 70 is provided with two apertures spaced laterally a distance corresponding to the placement of the control tracks and spaced vertically a distance corresponding to the phase difference in the tracks. The dimensions are, of course, optically reduced onto the film but maintain their relative positions. The image of the aperture plate is shown thrown onto the slit plate 71 which is provided with two slits each shown spaced vertically a distance corresponding to the apertures in the plate 70.

Light passing through the slits in the plate 71 is directed onto the film F by the objective 28 with such optical reduction as will place the two images in the proper relation to the sprocket holes. If desired and as is preferable, the Dove prism 27 may be used as in Fig. 2 and set at such an angle to give the desired slope to the wave images.

The double slit optical system used for reproducing this track is similar to that described in connection with Fig. 7 except that each slit covers only one-half of the width of the track. The light from both slits or scanning beams illuminates only a single photocell or alternatively two photocells connected in parallel as described above in conjunction with Fig. 7. The two tracks are preferably obscured over a portion of their length as described in connection with Fig. 7 so that the effective portions of the tracks are one-half sprocket hole pitch long. Since the frequencies from the two portions of the track are in phase with each other regardless of the recorder frequency, any appropriate frequencies may be used for this type of control track. As with the other forms of the invention, a number of frequencies may be recorded simultaneously and separated by band pass filters for various purposes.

We claim as our invention:

1. A sound film having a control track thereon in alignment with the sprocket holes of the film, the said control track including a series of wave images of higher frequency than the sprocket-hole frequency, and the axes of the wave images being tilted at an angle other than 90° to the axis of the sprocket holes.

2. A sound film having a control track thereon in alignment with the sprocket holes of the film, the said control track including a series of wave images of higher frequency than the sprocket hole frequency, and the axes of the wave images being tilted at such an angle to the axis of the sprocket holes that in reproduction by a scanning beam tilted at the same angle as the wave images, the scanning beam will not be unduly influenced by the sprocket hole edges.

3. In combination, a film carrying a control track in the sprocket-hole area, the said control track having wave images having their axes at an angle other than 90° to the axis of the sprocket holes, and a reproducer having a scanning beam tilted at the same angle to the axis of the sprocket holes as the wave images whereby said wave images will be reproduced at their full amplitude but impulses tending to be produced by the edges of the sprocket holes will be reproduced at a much lower amplitude.

4. A recorder for photographically recording waves having their axes at an angle other than 90° to the axis of movement of the film, said recorder including a light source, light modulating means, means for defining a line of modulated light, means for focusing said line of modulated light on a film, and means between said line defining means and said film for rotating the beam of light a predetermined amount.

5. A film having sprocket holes therein, a photographic control track in alignment with said sprocket holes, said control track including groups of a whole number of wave images in a distance equal to one-half of the sprocket hole pitch and said groups of images being separated a distance equal to one-half of the sprocket-hole pitch.

6. In combination, a film having sprocket holes therein and a photographic control track thereon, said control track including a whole number of wave images in a distance equal to one-half of the sprocket-hole pitch and said groups of images being separated a distance equal to one-half of the sprocket hole pitch, and a reproducer including means for producing a pair of scanning beams on said control track spaced apart a distance equal to half of the sprocket-hole pitch.

7. Apparatus for recording or reproducing a control track in the sprocket-hole area of a film, including a drum adapted to support the film, sprocket teeth adapted to cooperate with sprocket holes in the film, and slots having a pitch equal to the sprocket hole pitch and a width of one-half of the sprocket hole pitch for obscuring predetermined portions of the sprocket hole area of the film.

8. A film having a photographic control track thereon in alignment with the sprocket holes of the film, said control track including two series of similar wave images having a phase difference measured longitudinally of the film equal to one-half of the sprocket-hole pitch.

9. A film having a photographic control track thereon in alignment with the sprocket holes of the film, said control track including two parallel series of similar wave images having a phase difference measured longitudinally of the film equal to one-half of the sprocket-hole pitch.

10. A reproducer for reproducing a control track frequency recorded in alignment with the sprocket holes of a film, the control track frequencies being higher than the sprocket-hole frequency, including a photoelectric reproducer, an amplifier, means for separating impulses produced by the control frequency from impulses produced from the sprocket-hole frequency, and means controlled by the impulses produced by the sprocket hole frequency for controlling the gain of the amplifier.

11. A reproducer for reproducing photographic wave records having a constant average transmission, including a photocell, an amplifier for amplifying the output from the photocell, potential deriving means in the circuit supplying current to said photocell, and means connecting said potential deriving means to said amplifier whereby said amplifier is controlled in accordance with the average photocell current.

12. A reproducer for reproducing photographic wave records having a constant average transmission, including a photocell, an amplifier for amplifying the output from the photocell, potential deriving means in the circuit supplying current to said photocell, an amplifier controlled by the potential from said potential deriving means, and means for controlling said first amplifier from the second said amplifier.

13. A reproducer for reproducing photographic wave records having a constant average transmission, including a photocell, an amplifier for amplifying the output from the photocell, potential deriving means in the circuit supplying current to said photocell, a logarithmic amplifier controlled by the potential from said potential deriving means, and means for controlling said first amplifier from the second said amplifier.

EDWARD W. KELLOGG.
HILLEL I. REISKIND.